W. DIXON.
STRAINER.
APPLICATION FILED MAY 10, 1918.

1,392,000. Patented Sept. 27, 1921.

Witnesses

Inventor
WALTER DIXON
By his Attorneys

UNITED STATES PATENT OFFICE.

WALTER DIXON, OF KIMBALL, MINNESOTA.

STRAINER.

1,392,000.  Specification of Letters Patent.  Patented Sept. 27, 1921.

Application filed May 10, 1918. Serial No. 233,643.

*To all whom it may concern:*

Be it known that I, WALTER DIXON, a citizen of the United States, resident of Kimball, county of Stearns, State of Minnesota, have invented certain new and useful Improvements in Strainers, of which the following is a specification.

My invention relates in general to strainers and particularly to milk strainers and the object of the invention is to provide a strainer having the straining orifices or openings in the walls of the strainer so located that horizontal straining surfaces will be avoided and a pocket or receptacle will be formed in the bottom of the strainer for the collection of sediment or any foreign material which may be mixed with the milk.

A further object is to provide a strainer having a removable base ring for supporting the cone-shaped strainer in an upright position and permitting, when removed, access to all parts of the walls of the strainer for cleansing purposes.

A further object is to provide a strainer of simple construction and one which can be easily manufactured and at a comparatively small expense.

The invention consists generally in various constructions and combinations, all as hereinafter described and particularly pointed out in the claim.

Figure 1:
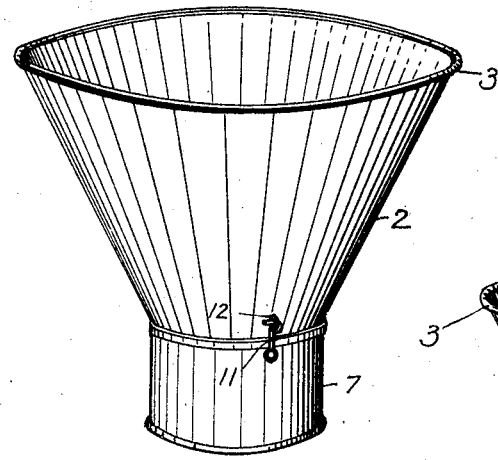
Figure 2:
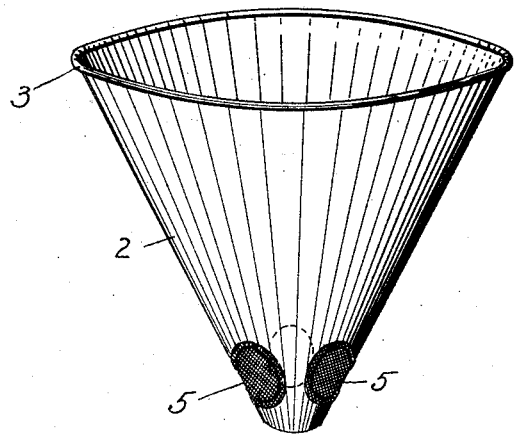
Figure 3:
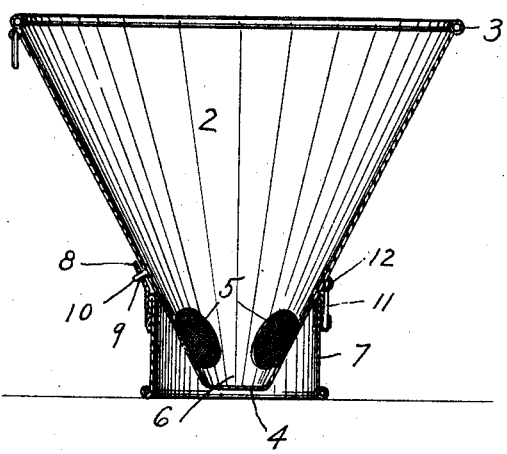
Figure 4:
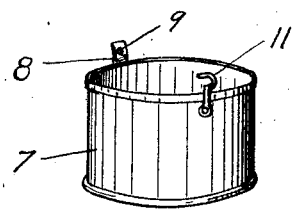

In the accompanying drawings forming part of this specification,

Figure 1 is a perspective view of the assembled strainer embodying my invention, Fig. 2 is a similar view with the base ring removed, Fig. 3 is a vertical sectional view through the strainer, Fig. 4 is a perspective view of the base ring.

In the drawing, 2 represents the strainer, preferably conical in form, having the usual strengthening ring 3 at the top and tapering to a substantially flat bottom 4 at the lower end. A suitable distance above this flat bottom I provide a series of screening openings 5, preferably three in number, through which the milk flows from the strainer. These screens are of suitable mesh to properly strain the milk and below them a chamber 6 is formed for the accumulation of sediment and foreign material which may be in the milk and which would ordinarily collect on and clog the wire mesh if located as usual in the bottom of the strainer. These straining openings being located in the inclined walls of the strainer, while allowing the milk to flow freely therethrough, will tend to direct any sediment down the inclined sides of the walls upon the bottom 4 where it can be readily removed when the straining operation is completed.

7 represents a base ring in which the lower tapered end of the strainer is seated and one side of said ring has an ear 8 thereon provided with a perforation 9 to receive a pin 10 mounted in the wall of the strainer and the other side of the ring is provided with a hook 11 to engage an eye 12 also mounted in the strainer wall and thereby the base ring and strainer will be securely locked together until such time as the user wishes to wash the strainer, when the ring may be detached and it and the cone-shaped portion of the strainer thoroughly scalded and cleansed of all impurities and any accumulation of milk thereon. Generally in strainers of ordinary construction there is an acute angle formed between the tapered walls of the strainer and the supporting base and in this angle sediment will accumulate and the milk will often collect and dry and it is very difficult to thoroughly remove it. This removable ring eliminates entirely the objection to a strainer as ordinarily constructed and makes it possible to keep the strainer surface thoroughly clean and sanitary at all times. The strainer is made of sheet metal of suitable gage and its size may be varied and the strainer openings may be increased or decreased in size as experience may seem advisable.

I claim as my invention:

A strainer comprising a member having a flat closed bottom and side walls flaring upwardly and outwardly from said bottom to form a cone-shaped receptacle, said flaring walls having screened openings above said closed bottom, whereby the settlings will collect on said bottom during the straining operation, a ring adapted to receive the lower end of said member and having a seat therefor, and means for securing said ring to the walls of said member.

In witness whereof I have hereunto set my hand this 22nd day of April, 1918.

WALTER DIXON.

Witnesses:
C. D. BROWER,
A. H. LOFSTROM.